G. FORNACA.
COMBUSTION ENGINE.
APPLICATION FILED AUG. 12, 1911.
1,073,671.
Patented Sept. 23, 1913.
2 SHEETS—SHEET 1.
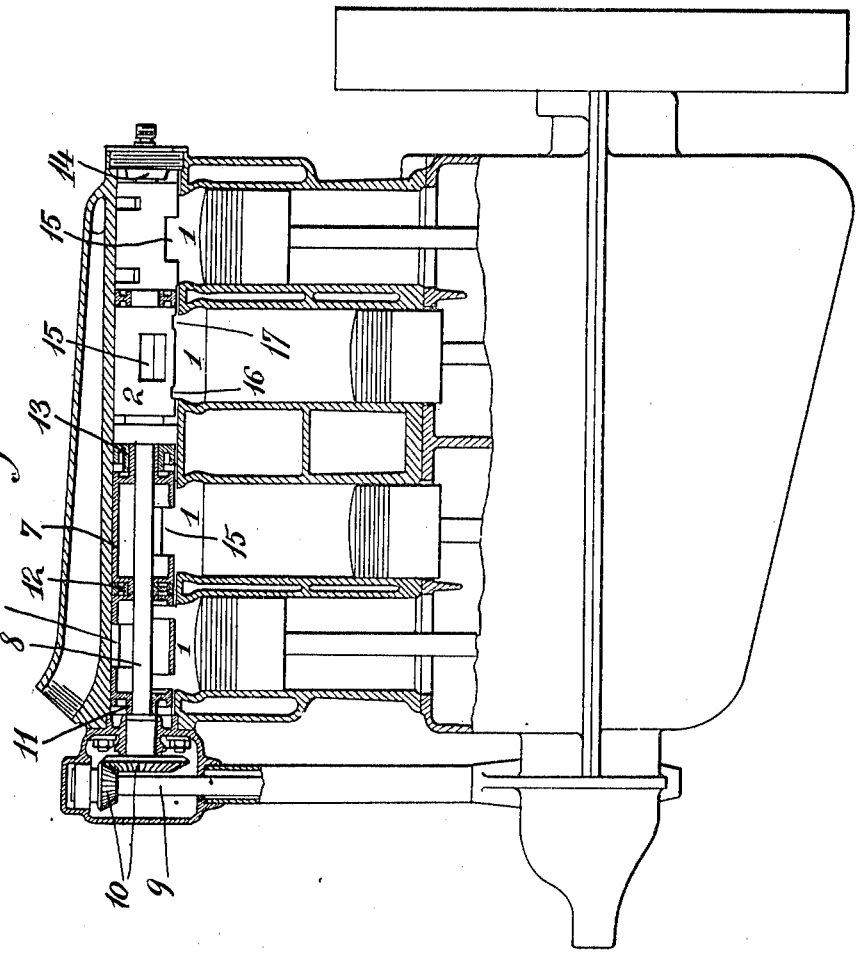
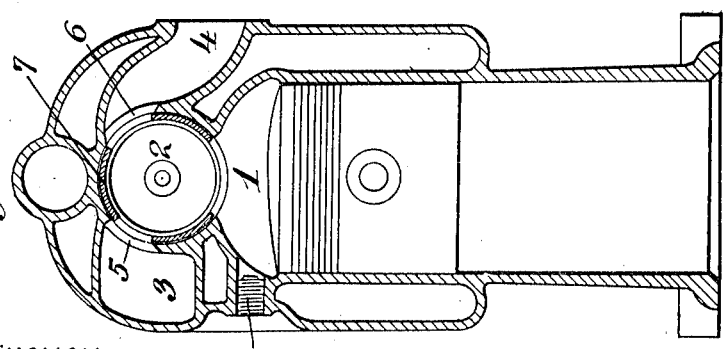

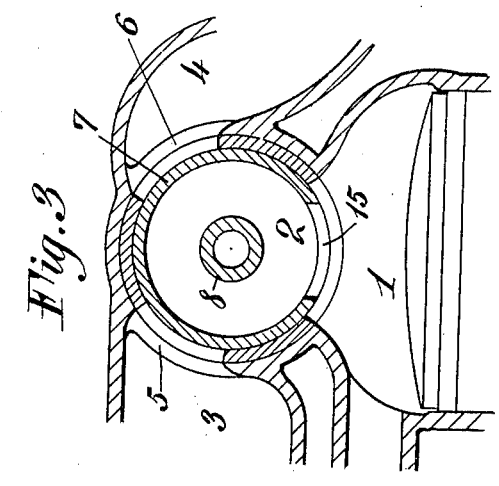
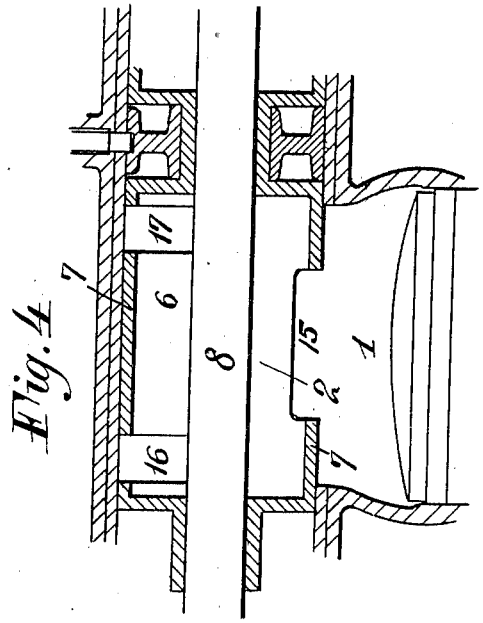
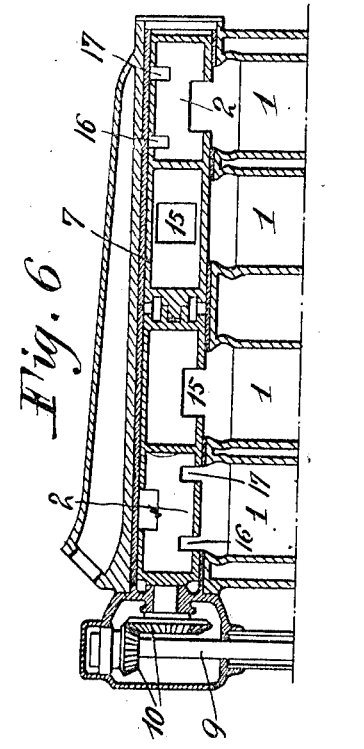
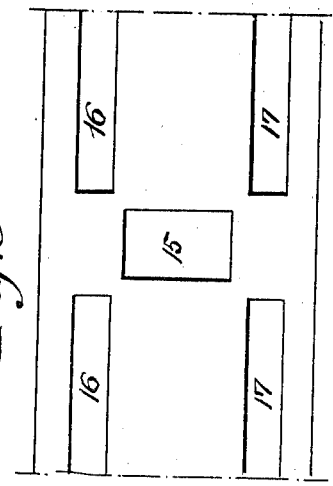

UNITED STATES PATENT OFFICE.

GUIDO FORNACA, OF TURIN, ITALY.

COMBUSTION-ENGINE.

1,073,671.   Specification of Letters Patent.   Patented Sept. 23, 1913.

Application filed August 12, 1911. Serial No. 643,656.

*To all whom it may concern:*

Be it known that I, GUIDO FORNACA, a subject of the King of Italy, residing at Turin, in the Province of Piedmont, Italy, have invented certain new and useful Improvements in Combustion-Engines, of which the following is a full, clear, and exact specification.

This invention relates to improvements in combustion engines, and has particular reference to the elimination of puppet valves in favor of a single rotary valve, which alternately controls the inlet and exhaust in predetermined succession, while forming in itself always a portion of the interior of the cylinder. By providing a hollow rotary valve which shall at all times be in communication with the interior of the cylinder, while itself controlling in proper succession the admission and exhaustive gases; the valve is kept at a more even temperature, and is less subject to become jammed, than where the valve is exterior of the combustion space of the cylinder. Furthermore, when the valve is, so to speak, within the cylinder, the pressures acting against the valve tend naturally to make it fit tightly in its seat which is a further advantage.

The invention will be more fully understood in connection with the description of the accompanying drawings, in which—

Figure 1 is a longitudinal section of a portion of a four-cylinder engine showing the invention; Fig. 2 is a transverse section; Fig. 3 is a transverse section on a large scale; Fig. 4 is a longitudinal section on a large scale; Fig. 5 is a development of the rotary valve, showing the disposition and relation of ports, and Fig. 6 is a longitudinal section of a portion of the engine showing slight modifications.

The engine has the same general form as an ordinary engine, as to pistons, cylinders, crank shaft, etc., but the compression space above the piston so far as formed by the cylinder head is made considerably smaller than is at present the practice with engines using puppet valves, and above this compression space is formed additional compression space consisting of the interior of the rotary valve, which is at all times in communication with the cylinder. The cylinder head is additionally provided with inlet and exhaust passages disposed at a predetermined distance apart so that they can be opened in succession by the rotation of the valve. The inlet passage may be manifolded wherever necessary for multiple cylinders, and the exhaust will be suitably arranged according to present practice, these features not being parts of this invention, and not claimed herein.

The compression chamber comprises the space within a somewhat hemispherical head 1, together with a cylindrical chamber 2, which is always in communication with the head space through ports in the rotary valve, and the cubic capacity of these spaces is about one-third or one-fourth that of the working cylinder, as in ordinary practice. In a multiple cylinder engine wherein the cylinders are cast integrally, or in groups, the upper cylindrical compression spaces may all be formed at the same time, to receive the valve which will be suitably divided to independently control each cylinder.

Communicating with the chamber 2 of each cylinder is an inlet passage 3 on one side and an exhaust passage 4 on the other, these passages as herein shown being cast integrally with the cylinders, water jacket and the cylinder heads. The inlet pipes 3 open into the cylindrical chambers 2 through inlet ports 5, the exhaust passages 4 through exhaust ports 6, these ports preferably being of rectangular shape and of an area determined according to the designed speed of the engine.

Inside the chamber 2 is arranged the rotary cylindrical valve 7, which consists of a tube having its walls thin in relation to the diameter, closed at each end, and mounted on a central driving shaft 8 which may be operated from the crank shaft by means of the secondary shaft 9 and gears 10, which run, in the case of a four-cycle engine as herein shown at one-half the speed of the crank shaft. The shaft 8, as shown in Fig. 1, is journaled in supports 11, 12, 13 and 14, which are suitably fastened to the walls of the casting so as to be adjustable and removable when necessary. It will be seen that while there is one valve for all of the cylinders, it is divided into compartments according to the number of cylinders.

The valve 7, which is shown developed in Fig. 5, is provided with three ports, 15 being the main central port and having substantially the same area as the inlet and exhaust ports 5 and 6.

16 and 17 are auxiliary ports which are outside of the main port 15 of the valve, and the inlet and exhaust ports 5 and 6 of the cylinder, and the function of these auxiliary ports 16 and 17 is to maintain communication between the cylinder and the interior of the valve when the main port 15 is closed against one of the walls of the cylinder space 2, or when it is desired to admit or exhaust gas through the ports 5, 6, respectively. In order to maintain ample communication between the auxiliary compression space 2 and the cylinder space 1, these ports 16 and 17 have a total area greater than that of the main port 15. Thus the admission and exhaust of gases is unrestricted, and quick combustion and application of the explosive force of the gases to the piston is not interfered with.

During the inlet period, the main port 15 of the valve registers with the inlet port 5 of the cylinder, and the charge is drawn in through these openings and the openings 16 and 17 into the cylinder, so that a full charge is drawn into the cylinder during one down stroke of the working piston. During this down stroke, the valve 7 is rotating in a counter clock-wise direction, and the valve is gradually covering the port 5, which is completely closed at about the end of the stroke. During this time the exhaust opening is covered by the valve 7. The compression period lasts during the up stroke of the working piston, and the main port 15 of the valve moves in the same direction as before until its central line is exactly over the center of the cylinder, and the secondary lateral ports 16 and 17 are covered by the upward walls of the space 2. From Figs. 3 and 4, which show the positions of the parts at the end of the compression period, it will be seen that free communication exists between the two spaces 1 and 2, save as to the two lateral edges of the valve port 15, which have only a small surface. The explosion being effected through the igniter 18 exerts its maximum useful effect, and only a small portion of the outer wall of the valve is directly exposed to the flame. I have discovered that the expansion of these small edges directly exposed to the flame, instead of being injurious and tending to stick or jam the valve, produce a useful effect in that they tend to more tightly close the joint and prevent leakage of gas. During the working stroke, when the piston is again descending, the port 15 travels upward from its lowest position and becomes covered by the cylinder wall, but the ports 16 and 17 at the same time become uncovered, so that at each instant, the sum of the three sectional areas affords constant passage area between the spaces 1 and 2. When the piston again moves upward for the exhaust, the port 15 uncovers the exhaust port 6 progressively, but at this time it will be seen that the two portions 1 and 2 of the compression space remain in communication through ports 16 and 17, which are fully open. At the end of the exhaust period port 15 is closed against the upper wall of the cylinder between the ports 5 and 6, while the ports 16 and 17 are open below.

By reason of the combination of the rotary valve with the ports described, it will be seen that the engine works in a normal manner, with always ample port area for the gases, and by suitably determining the dimensions of the valve ports and the cylinder ports, any desired governing can be obtained, with suitable advance and retardation for the several strokes, according to the speed and characteristics desired. Since the main port 15 of the valve operates in succession for the passage of the exhaust gas and the inlet of the charge, and since the secondary ports 16 and 17 and the internal walls of the valve are brought successively in contact with these gases, the valve is kept at a mean temperature low enough to prevent deterioration of the valve body. Also, the lubrication of this structure is very simple.

In Fig. 6 is shown a modification wherein the valve consists of a tube divided by walls into sections corresponding to the number of cylinders, the shaft 8 and intermediate supports being dispensed with, and the outer surface of the tube acting as a support. Also in the drawings is shown between the cylinder and the valve a second tube or bushing, which is provided with the same ports for suction and exhaust, and which while not an essential element of the invention is useful for constructional reasons, this permitting the suction and exhaust ports to be controlled with better and greater precision from the outside, and also permitting its construction of special material having a coefficient of expansion so as to prevent jamming.

Various modifications may be made in the construction and details without departing from the scope of the invention.

Having thus described my invention, I declare that what I claim as new and desire to secure by Letters Patent, is:—

1. The combination in a combustion engine, with a cylinder and a piston, of a cylindrical transversely extending valve chamber formed in the cylinder head, separate inlet and exhaust passages opening into said valve chamber, a passage from said valve chamber to the interior of the cylinder, and a cylindrical rotary valve mounted in said valve chamber having a port for opening said inlet and exhaust to the valve interior and the valve interior to the cylinder at predetermined times, and another port opening the interior of the valve to the cylinder at predetermined times such that the interior of the valve is always in communication with the cylinder through one or the other of said ports.

2. The combination in a combustion engine, with a cylinder and a piston, of a transversely extending cylindrical valve chamber formed in the cylinder head, separate inlet and exhaust passages leading to said valve chamber, a passage leading therefrom to the cylinder, and a rotary hollow valve in said chamber for controlling said inlet and exhaust passages and having its interior always in communication with the interior of the cylinder, said valve comprising a cylindrical casing provided with a middle port controlling said inlet and exhaust passages, and another port at one side of said middle port, said ports at all times permitting communication between the valve interior and the cylinder through one or the other.

3. In a combustion engine, a transversely extending cylindrical valve casing, circumferentially separated inlet and exhaust passages connected therewith, a transversely extending hollow cylindrical valve mounted in said chamber having a main port for controlling said passages in succession with an intervening period of closing both passages, and an auxiliary port in said valve at one side of and opposite said main port for opening the interior of the valve to the engine cylinder when communication through the main port between the cylinder and valve interior is cut off.

4. In a multiple cylinder combustion engine, the combination with a plurality of parallel cylinders, of cylindrical valve chambers for the respective cylinders arranged in axial alinement, a cylindrical valve body having a chamber for each cylinder journaled on said cylinders, a main port for each cylinder in said valve body, inlet and exhaust passages for each cylinder, and auxiliary ports for each cylinder in said valve body for opening the interior of each valve to the cylinder when communication through the main port is cut off.

5. In a combustion engine, a thin walled hollow rotary valve having a port in the side for admitting and exhausting gases, the thin and narrow longitudinal side edges of said port being exposed to the flame of the explosion on both sides, the interior of the valve being always in communication with the interior of the cylinder, and the ends being closed.

In testimony whereof I affix my signature. in presence of two witnesses.

GUIDO FORNACA.

Witnesses:
 Piero Gianolio,
 Jocelyn Goubeyran.